Patented Dec. 30, 1952

2,623,878

UNITED STATES PATENT OFFICE 2,623,878

2,4-DISUBSTITUTED AMINO QUINAZOLINES

Hans Isler, Bottmingen, and Albrecht Hueni, Basel, Switzerland, assignors to Ciba Pharmaceutical Products, Inc., Summit, N. J.

No Drawing. Application January 28, 1949, Serial No. 73,435. In Switzerland February 9, 1948

11 Claims. (Cl. 260—256.4)

The present invention relates to 2,4-diamino-quinazolines, the nucleus of which has the configuration:

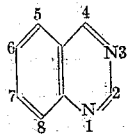

and one of the amino groups of which is bound directly to a thiazole ring or imidazole ring, preferably a benzthiazole or a benzimidazole ring, while the other amino group carries an organic substituent having a strong basic group. The invention relates further to the salts of the said 2,4-diamino-quinazolines with inorganic or organic acids, for example with hydrohalic acids such as hydrochloric or sulfuric acid, phosphoric acid, methane sulfonic acid, toluene sulfonic acid, acetic acid, oxalic acid, citric acid, etc. These compounds may bear further substituents, such as alkyl, phenyl, nitro, amino, cyano, free or substituted hydroxy or mercapto groups, halogen atoms or fused-on aromatic or heterocyclic nuclei. The organic substituent having a strongly basic group may be a straight or branched aliphatic residue, which may be interrupted by heteroatoms such as oxygen or sulfur, or a carbocyclic or aliphatic-carbocyclic residue. The strongly basic group is especially the diethylamino group, but may also be another radical such as a free amino, alkylamino or another dialkylamino group, for example, a dipropylamino or dibutylamino group or an alkylene-amino group such as a piperidino or morpholino group.

The new compounds of the invention are characterized by pharmacological activity especially against virulent tubercle bacilli. Particularly valuable are benzthiazolyl-diamino-quinazolines such as the 2-[benzthiazolyl-(2')-amino]-4-(dialkylamino-alkylamino)-quinazolines, and in particular 2-[6'-methyl-benzthiazolyl-(2')-amino]-4-(β-diethylamino-ethylamino)-quinazoline of the formula:

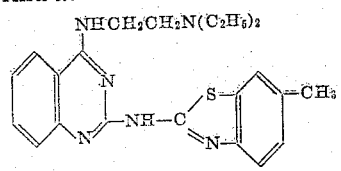

These heterocyclically substituted diamino-quinazolines are thus adapted to find application as medicaments.

According to this invention, the new compounds may be made by replacing by an amino group, which is directly bound to a thiazole ring or an imidazole ring, an exchangeable substituent present either in the 2- or 4-position of a quinazoline which contains in the other one of these two positions an amino group which carries an organic substituent having a strongly basic group, or by replacing by an amino group, which contains an organic substituent having a strongly basic group, an exchangeable substituent present either in the 2- or 4-position of a quinazoline containing in the other one of these two positions an amino group which is directly bound to a thiazole ring or an imidazole ring.

Accordingly, a quinazoline containing the 2- or 4-position an exchangeable substituent, such as a halogen atom, a substituted hydroxyl or mercapto group, may be reacted either with an amino compound of which the amino group is bound to be a thiazole ring or to an imidazole ring, for example, with a 2-amino-benzthiazole, or with an organic amino compound containing a further strongly basic group, for example, with a primary or secondary dialkylaminoalkylamine, depending on the nature of the substituent present in the other of the said positions.

The starting materials for use in thus preparing the compounds of the invention are known or can be prepared from quinazoline having exchangeable substituents, such as halogen atoms, in the 2- and 4-positions, by reaction with the corresponding amines.

The reactions described above may be carried out in the presence or absence of a diluent, such as water, glacial acetic acid, acetone, ether, dioxane, benzene, toluene or xylene. Furthermore, depending on the reaction components and conditions of operation, the process may be conducted in the presence of an agent capable of binding acid and/or a condensing agent and/or a catalyst, for example, in the presence of an excess of an amine used for reaction or of another inorganic or organic base. Substituents which happen to be present in the obtained products may be dealt with in known manner; thus, for example, a nitro group may be reduced to an amino group.

The new compounds may be obtained as free bases or as salts thereof. If the product of this process is not a salt of one of the above mentioned acids it can be converted into such by a known method.

The following illustrative examples describe the invention in greater detail without however restricting its scope in any way. The relation-

Example 1

129 parts by weight of 2-chloro-4-($\beta$-diethylamino-ethylamino)-quinazoline-hydrochloride are thoroughly mixed with 70 parts by weight of 2-amino-6-methyl-benzthiazole, and heated in an oil bath. The molten mixture reacts with the spontaneous evolution of heat at an oil bath temperature of 150–200°. The bath temperature is maintained at 200° for a short time, and the powdered product, obtained after cooling, is recrystallized from 2750 parts by volume of ethanol of 96 per cent. strength with the addition of animal charcoal. From an aqueous solution of the hydrochloride melting at 296–298° (with decomposition) so obtained, 2-[6'-methyl-benzthiazolyl-(2')-amino]-4-($\beta$-diethylamino-ethylamino)-quanazoline of the formula

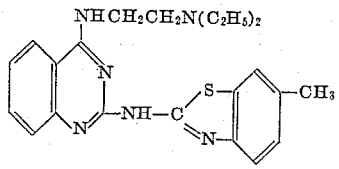

is liberated by means of caustic soda solution. After recrystallization from benzene it melts at 189–191°.

Example 2

8 parts by weight of 2,6-dichloro-4-($\beta$-diethylamino-ethylamino)-quinazoline-hydrochloride and 3.9 parts by weight of 2-amino-6-methyl-benzthiazole are reacted by the procedure described in Example 1, the resulting salt is recrystallized from 1500 parts by volume of water, and converted into 2-[6'-methyl-benzthiazolyl-(2')-amino]-4-($\beta$-diethylamino-ethylamino)-6-chloro-quinazoline of the formula

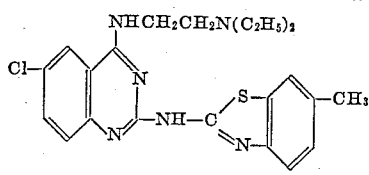

which melts at 226–228° after recrystallization from benzene.

Example 3

10 parts by weight of 2-chloro-4-($\beta$-diethylamino-ethylamino)-quinazoline-hydrochloride and 4.9 parts by weight of 2-amino-benzthiazole are reacted by the procedure described in Example 1. The resulting salt is suspended in 250 parts by volume of hot ethanol of 96 per cent. strength, the whole is allowed to cool and is filtered with suction, and the product then melts at 305–307° (with decomposition). An aqueous solution of the latter product is mixed with caustic soda solution to yield 2-[benzthiazolyl-(2')-amino]-4-($\beta$-diethylamino-ethylamino)-quinazoline of the formula

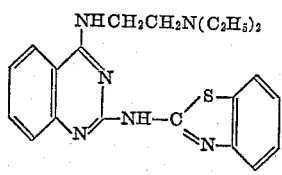

which melts at 216–218° after recrystallization from benzene.

Example 4

31.3 parts by weight of 2,6-dichloro-4-($\beta$-diethylamino-ethylamino)-quinazoline are thoroughly mixed with 16.2 parts by weight of 2-amino-thiazole-hydrochloride hydrate, and the whole is heated in an oil bath. At a bath temperature of 140–148°, the molten mass reacts with the spontaneous evolution of heat. The bath temperature is maintained at 200° for a short time, the melt is cooled and pulverized, and the pulverized product is crystallized from 450 parts of butanol with the addition of animal charcoal.

In this manner, 2-[thiazolyl-(2')-amino]-4-($\beta$-diethylamino-ethylamino)-6-chloroquinazoline-hydrochloride is obtained melting at 286–288° (with decomposition). The free base of the formula

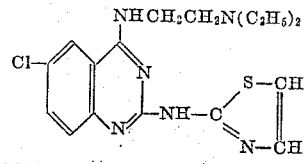

melts at 180.5–181° after recrystallization from a mixture of benzene and petroleum ether.

Example 5

27.9 parts by weight of 2-chloro-4-($\beta$-diethylamino-ethyl-amino)-quinazoline and 15.5 parts by weight of 2-amino-thiazole-hydrochloride hydrate are brought into reaction by the procedure described in Example 4, and the resulting salt is recrystallized from 850 parts by volume of absolute ethanol. The salt then melts at 297–298° (with decomposition).

By dissolving the product in water and mixing it with caustic soda solution, there is obtained 2-[thiazolyl-(2')-amino]-4-($\beta$-diethylamino-ethylamino)-quinazoline of the formula

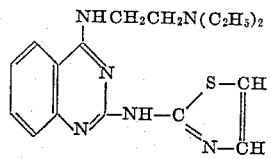

which is recrystallized from a mixture of benzene and petroleum ether with the addition of animal charcoal. It then melts at 142–143°.

Example 6

10 parts by weight of 2-chloro-4-($\beta$-diethylamino-ethylamino)-quinazoline-hydrochloride are thoroughly mixed with 4.3 parts by weight of 2-amino-benzimidazole, and heated in an oil bath. The temperature of the bath is raised to 210° and maintained at this temperature for a short time, whereby the initially molten mixture becomes thick with the spontaneous evolution of heat.

The powdered substance obtained after cooling is crystallized from 50 parts by volume of butanol, and, by admixing an aqueous solution thereof with caustic soda solution, there is obtained 2-[benzimidazoyl-(2')-amino]-4-($\beta$-diethylamino-ethylamino)-quinazoline of the formula

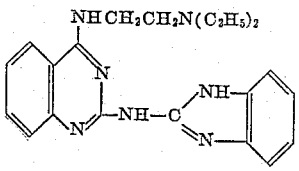

which melts at 224–226° after recrystallization from benzene.

*Example 7*

10 parts by weight of 2,6-dichloro-4-(β-diethylamino-ethylamino)-quinazoline-hydrochloride and 3.9 parts by weight of 2-amino-benzimidazole are brought into reaction by the procedure described in Example 6. The resulting salt is recrystallized from 125 parts by volume of butanol with the addition of animal charcoal, dissolved in water, and converted by the addition of caustic soda solution into 2-[benzimidazolyl-(2')-amino]-4-(β-diethylamino-ethylamino)-6-chloroquinazoline of the formula

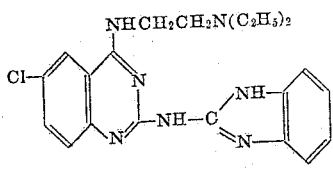

which melts at 196–197° after recrystallization from benzene.

*Example 8*

8.2 parts by weight of 2-chloro-4-(γ-diethylamino-propylamino)-quinazoline are thoroughly mixed with 5.7 parts by weight of 2-amino-6-methyl-benzthiazole-hydrochloride, and the mixture is heated in an oil bath. When the oil bath temperature is between 150° and 200°, the reaction will have set in, and the oil bath temperature is maintained at 200° for a short time. After being cooled the powdered substance is then recrystallized from 50 parts of ethanol of 96 per cent. strength with the addition of animal charcoal.

The resulting hydrochloride is dissolved in water, and by means of caustic soda solution there is obtained 2-[6'-methyl-benzthiazolyl-(2')-amino]-4-(γ-diethylamino-propylamino)-quinazoline of the formula

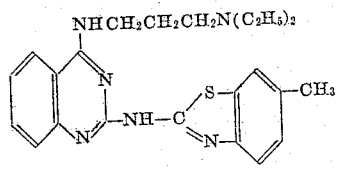

which melts at 202–204° after recrystallization from a mixture of benzene and petroleum ether.

*Example 9*

31.5 parts by weight of 2-chloro-4-(β-diethylamino-ethylamino)-quinazoline-hydrochloride and 18.5 parts by weight of 2-amino-6-chloro-benzthiazole are thoroughly mixed together and heated in an oil bath. When the bath temperature is between 150° and 200°, the melt begins to react with the spontaneous evolution of heat, and then the bath temperature is maintained for a short time longer at 200°. The melt is then cooled and pulverized, and the pulverized product is recrystallized from 6000 parts by volume of ethanol of 96 per cent. strength with the addition of animal charcoal. From the resulting hydrochloride melting at 310–311° (with decomposition), there is obtained by disolution in water and precepitation with caustic soda solution 2-[6'-chloro-benzthiazolyl-(2')-amino]-4-(β-diethylamino-ethylamino)-quinazoline of the formula

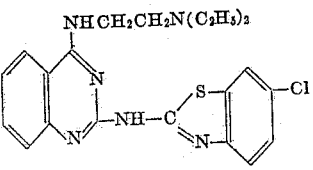

which melts at 210–211° after recrystallization from ethanol or benzene. The dimethane-sulphonate melting at 302–304° can be obtained from the base by means of two molecular proportions of methane-sulphonic acid in ethanol. In a similar manner the free base may be reacted with another acid, for example, with sulfuric acid, phosphoric acid, toluene sulfonic acid, acetic acid, oxalic acid or citric acid to form the corresponding salts.

*Example 10*

31.5 parts by weight of 2-chloro-4-(β-diethylamino-ethylamino)-quinazoline-hydrochloride and 18 parts by weight of 2-amino-6-methoxy-benzthiazole are brought into reaction in a manner analogous to that described in Example 9, and the resulting salt is recrystallized from 1000 parts by volume of absolute ethanol, after which it melts at 293–295° (with decomposition). The 2-[6'-methoxy-benzthiazolyl-(2')-amino]-4-(β-diethylamino-ethylamino)-quinazoline of the formula

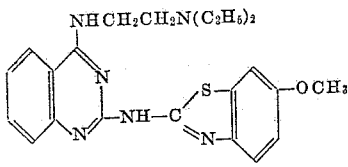

may be recrystallized from a mixture of benzene and petroleum ether with the addition of animal charcoal, and then melts at 186–187°.

*Example 11*

35 parts by weight of 2,6-dichloro-4-(β-diethylamino-ethylamino)-quinazoline-hydrochloride and 18 parts by weight of 2-amino-6-methoxy-benzthiazole are brought into reaction by the procedure described in Example 9, and the resulting salt is digested but with 1250 parts by volume of absolute ethanol, allowed to cool, and filtered with suction. By mixing this salt, which melts at 299–300° (with decomposition), in aqueous solution with caustic soda solution there is obtained 2-[6'-methoxy-benzthiazolyl-(2')-amino]-4-(β-diethylamino-ethylamino)-6-chloro-quinazoline. The base has the formula

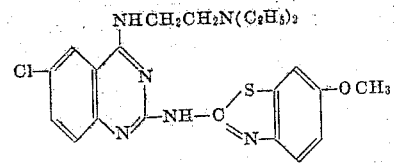

and can be recrystallized from benzene, and then melts at 197–198°.

*Example 12*

4 parts by weight of 2-chloro-4-(β-diethylamino-ethylamino)-quinazoline-hydrochloride and 2.2 parts by weight of 2-amino-4,7-dimethyl-benzthiazole (melting point 158–160°, prepared in conventional manner from 2,5-dimethyl-phenyl-thiourea) are heated to 120–140° for 10 hours in a closed receptacle containing 20 parts by volume of water, 8 parts by volume of dioxane and 0.15 part by volume of concentrated aqueous hydrochloric acid. The precipitated hydrochloride can be recrystallized from a mixture of ethanol, water and acetone with the addition of animal charcoal, whereupon it has a melting point of 339–342° (with decomposition). By addition of caustic soda to an aqueous solution of the hydrochloride, there is obtained the 2-[4',7'-dimethyl-benzthiazolyl-(2')-amino] - 4 - (β - diethylamino - ethylamino)-quinazoline of the formula

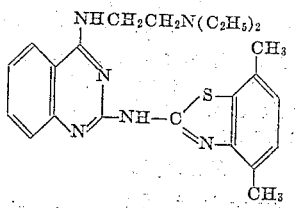

which, recrystallized from benzene-petroleum ether with addition of animal charcoal, melts at 205–207°.

*Example 13*

47.2 parts by weight of 2-chloro-4-(β-diethylamino - ethylamino) - quinazoline - hydrochloride and 30 parts by weight of 2-amino-6,7-benzo-benzthiazole are reacted after the manner of Example 1.

The pulverized reaction product is extracted with 1500 parts by volume of hot 96% ethanol and is then dissolved in water. By the addition of caustic soda to this solution, there is obtained the 2-[6',7'- benzo - benzthiazolyl -(2') - amino]-4 - (β - diethylamino - ethylamino) - quinazoline of the formula

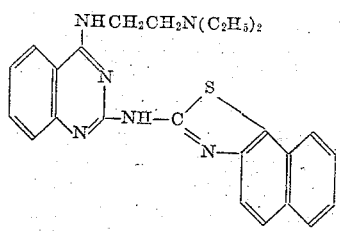

which, recrystallized from 96% ethanol, melts at 220–222°.

*Example 14*

10 parts by weight of 2-chloro-4-(β-diethylamino - ethylamino) - quinazoline - hydrochloride and 5.58 parts by weight of 2-amino-4-phenyl-thiazole are reacted after the manner of Example 1. The pulverized reaction mass is dissolved in 250 parts by volume of hot 96% ethanol, the solution filtered through animal charcoal, and ethyl acetate added, whereupon the hydrochloride crystallizes out. It is boiled with 100 parts by volume of absolute ethanol, dissolved in water and converted by means of caustic soda solution into the 2-[4'-phenyl-thiazolyl-(2')-amino] - 4 - (β - diethylamino - ethylamino)-quinazoline of the formula

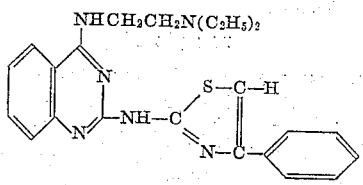

which, recrystallized from benzene-petroleum ether with addition of animal charcoal, melts at 172–174°.

*Example 15*

2 parts by weight of 2-methoxy-4-(β-diethylamino - ethylamino) - quinazoline - hemihydrate (prepared in conventional manner from 2-chloro - 4 - (β - diethylamino - ethylamino)-quinazoline by reaction with sodium methylate) and 1.2 parts by weight of 2-amino-6-methyl-benzthiazole are thoroughly admixed and slowly brought to a temperature of 200–250°. After a short time, the cooled mixture is taken up in absolute ethanol, filtered through animal charcoal, and concentrated aqueous hydrochloric acid added, thereupon the hydrochloride of 2-[6'-methyl - benzthiazolyl - (2') - amino] - 4 - (β-diethylamino - ethylamino) - quinazoline, already described in Example 1, crystallizes out.

*Example 16*

8.1 parts by weight of 2-chloro-4-(β-diethylamino - ethylamino - quinazoline - hydrochloride are reacted with 5 parts by weight of 2-amino-6-nitro-benzthiazole after the manner of Example 1.

The pulverized reaction product is dissolved in water, after extraction with hot 96% ethanol, and thereupon the 2-[6'-nitro-benzthiazolyl-(2') - amino] - 4 - (β - diethylamino - ethylamino)-quinazoline of the formula

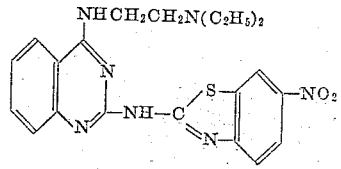

which, recrystallized from butanol, melts at 304–306°, is recovered from the aqueous solution with the aid of sodium bicarbonate solution.

*Example 17*

8 parts by weight of 2-chloro-4-[N-phenyl-N-(β - diethyl - amino - ethyl) -amino] - quinazoline-hydrochloride and 3.3 parts by weight of 2-amino-benzthiazole are reacted after the manner of Example 1.

The pulverized reaction mass, when recrystallized from absolute ethanol and ether, melts at 278–280°. From this hydrochloride there is obtained, by treatment with caustic soda solution, the 2 - [benzthiazolyl - (2') - amino] - 4 - [N-phenyl - N - (β - diethylamino - ethyl) - amino]-quinazoline of the formula

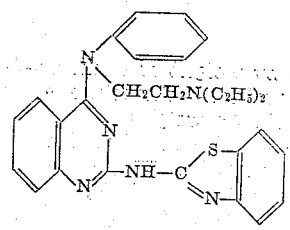

which, recrystallized from benzene-petroleum ether, melts at 168–169°.

The starting product, 2-chloro-4-[N-phenyl-N - (β - diethyl - amino - ethyl) - amino] -quinazoline-hydrochloride may be obtained for example as follows:

20 parts by weight of 2,4-dichloro-quinazoline are heated to boiling for 7 hours together with 19.2 parts by weight of N,N-diethyl-N'-phenyl-ethylene diamine in 100 parts by volume of benzene. After standing for some time, the crystals which form are suction-filtered.

23.5 parts by weight of these crystals are recrystallized from 100 parts by volume of water with the aid of animal charcoal. The thus-obtained 2-chloro-4-[N-phenyl-N-(β-diethyl-amino-ethyl)-amino]-quinazoline-hydrochloride melts at 239–241°.

Example 18

10 parts by weight of 2-chloro-4-[N-phenyl-N-(β-diethyl-amino-ethyl)-amino]-quinazoline-hydrochloride and 4.2 parts by weight of 2-amino-6-methyl-benzthiazole are reacted after the manner of Example 1. The obtained reaction product is recrystallized from 96% ethanol, with addition of animal charcoal, after ether has been added to the filtered solution. By means of caustic soda solution, the salt so obtained is converted into the 2-[6'-methyl-benzthiazolyl-(2')-amino]-4-[N-phenyl-N-(β-diethylamino-ethyl)-amino]-quinazoline of the formula

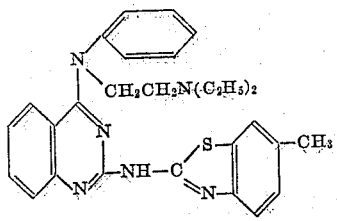

which, recrystallized from benzene-petroleum ether with addition of animal charcoal, melts at 180–182°.

Example 19

50 parts by weight of 2-chloro-4-(β-diethyl-amino-ethylamino)-quinazoline-hydrochloride and 25 parts by weight of 2-amino-4-methyl-benzthiazole are reacted after the manner of Example 1.

The pulverized reaction product is recrystallized from 2000 parts by volume of 96% ethanol with addition of animal charcoal, and the obtained hydrochloride is converted by means of caustic soda solution into the 2-[4'-methyl-benzthiazolyl-(2')-amino]-4-(β-diethylamino-ethylamino)-quinazoline of the formula

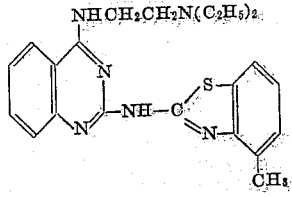

which, recrystallized from benzene-petroleum ether, melts at 193–195°.

Example 20

10 parts by weight of 2-chloro-4-hydroxy-quinazoline and 9 parts by weight of 2-amino-6-methyl-benzthiazole are thoroughly admixed and heated to 150–230° in the oil bath. Upon completion of the reaction, the pulverized product is extracted with 50 parts by volume of hot absolute ethanol and is then dissolved in methyl-carbitol. By addition of aqueous ammonia, there is obtained the 2-[6'-methyl-benzthiazolyl-(2')-amino]-4-hydroxy-quinazoline which, recrystallized from methyl-carbitol, melts at above 320°. 5 parts of the hydrochloride of the said product are boiled under reflux for a short time with 75 parts by volume of phosphorus oxychloride and 4.25 parts by volume of dimethyl-aniline. The mixture is then poured onto ice and rendered alkaline with 30% aqueous caustic soda solution. The washed precipitate is suction-filtered and dried in the dessicator.

1.7 parts by weight of the last-named product are heated for some time to 100° with 3 parts by volume of β-diethylamino-ethylamine and 10 parts by volume of glacial acetic acid. After dilution with 50 parts by volume of water, the hot solution is filtered through animal charcoal. Upon addition of caustic soda solution, there is obtained the 2-[6'-methyl-benzthiazolyl-(2')-amino]-4-(β-diethylamino-ethylamino)-quinazoline of Example 1.

Example 21

10 parts by weight of 2-chloro-4-(β-diethyl-amino-ethylamino)-quinazoline-hydrochloride are reacted with 4.8 parts by weight of 2-amino-6-methyl-benzimidazole after the manner of Example 6. The reaction product is obtained in crystalline hydrochloride form from 60 parts by volume of butanol, with addition of animal charcoal.

This hydrochloride is then converted by means of caustic soda solution into the 2-[6'-methyl-benzimidazolyl-(2')-amino]-4-(β-diethylamino-ethylamino)-quinazoline of the formula

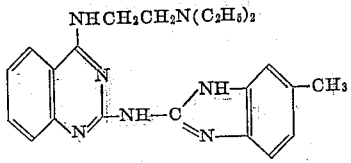

which, recrystallized from 96% ethanol, melts at 225–227°.

Other benzimidazole compounds can be prepared in a manner similar to that described in the other examples for the thiazole compounds.

Example 22

32 parts by weight of 2-chloro-4-hydroxy-quinazoline are dissolved in 700 parts by volume of absolute xylol and admixed hot with 20.5 parts by weight of β-diethylamino-ethylamine in 60 parts by volume of absolute xylol. The mixture is boiled for some time under reflux, then cooled and the formed oil separated by decantation. The aqueous solution of the benzene- and ether-extracted oil is filtered hot through animal charcoal, after shaking out with ether, and is then evaporated under reduced pressure. The residue is the 2-(β-diethylamino-ethylamino)-4-hydroxy-quinazoline-hydrochloride which, after recrystallization from 100 parts by volume of absolute ethanol, melts at 201–203°.

7 parts by weight of the last-mentioned hydrochloride are boiled under reflux with 30 parts by volume of phosphorus oxychloride and 5 parts by volume of dimethylaniline. Upon completion of the reaction, the excess of dimethylaniline and phosphorus oxychloride are distilled off under reduced pressure, and the residue, which contains the crude 2-(β-diethylamino-ethylamino)-4-chloro-quinazoline-hydrochloride, is heated with 9 parts by weight of 2-amino-6-methyl-benzthiazole to 200–250° and kept at this temperature for a short time. The reaction product is extracted with dilute hydrochloric acid, filtered hot through animal charcoal, and allowed to crystallize after addition of concentrated aqueous hydrochloric acid. The thus-obtained hydrochloride is converted, by the addition of caustic soda solution to its aqueous solution, into the 2-(β-diethylamino-ethylamino)-4-[6'-methyl-benzthiazolyl-(2')-amino]-quinazoline of the formula

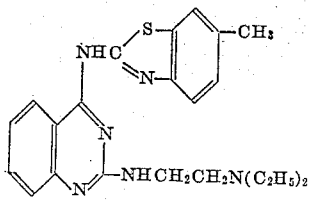

which, upon recrystallization from benzene, melts at 239–241°.

*Example 23*

6.3 parts by weight of 2-chloro-4-(β-diethylamino-ethylamino)-quinazoline-hydrochloride and 3.5 parts by weight of 2-amino-6-cyano-benzthiazole are treated according to the method described in Example 1. The pulverized melt is digested with 250 parts by volume of absolute ethanol in order to dissolve out impurities. The thus-treated hydrochloride, which has a melting point of 305–307°, is converted into the base, 2-[6'-cyano-benzthiazolyl-(2')-amino]-4-(β-diethylamino-ethylamino)-quinazoline of the formula

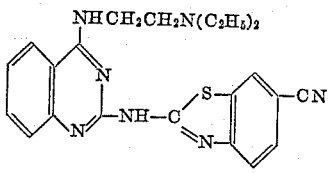

which has a melting point of 289–292°. The dimethane-sulfonate melts at 299–300°.

*Example 24*

9.5 parts by weight of 2-chloro-4-(β-diethylamino-ethylamino)-quinazoline-hydrochloride and 6.7 parts by weight of 2-amino-6-n-butoxy-benzthiazole are treated after the manner described in Example 1. The resultant salt is recrystallized from 100 parts by volume of 96% ethanol and then washed with acetone. It then melts at 273–275° (with decomposition). It is converted into the base, 2-[6'-n-butoxy-benzthiazolyl-(2')-amino]-4-(β-diethylamino-ethylamino)-quinazoline of the formula

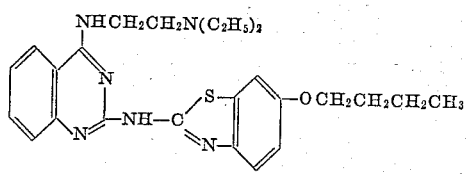

which, recrystallized from benzene-petroleum ether, melts at 168–169°.

*Example 25*

3.15 parts by weight of 2-chloro-4-(β-diethylamino-ethylamino)-quinazoline-hydrochloride and 2.1 parts by weight of 2-amino-6-acetamino-benzthiazole are reacted in the manner described in Example 1. The obtained salt is recrystallized from 220 parts by volume of 96% ethanol and 40 parts by volume of water, and then has a melting point of 317–319° (with decomposition). It is converted into the base 2-[6'-acetamino-benzthiazolyl-(2')-amino]-4-(β-diethylamino-ethylamino)-quinazoline of the formula

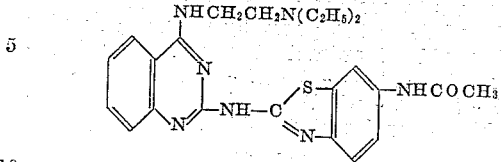

and the latter then recrystallized from a mixture of benzene, absolute ethanol and petroleum ether, whereupon the product has a melting point of 252–257°.

*Example 26*

5.5 parts by weight of 2-chloro-4-[p-(β-diethylamino-ethoxy)-anilino]-quinazoline-hydrochloride and 2.8 parts by weight of 2-amino-6-acetamino-benzthiazole are treated according to the process described in Example 1. The pulverized melt is recrystallized from 50 parts by volume of 96% ethanol. The thus-obtained hydrochloride melts at 292–297°. It is converted into the base, 2-[6'-acetamino-benzthiazolyl-(2')-amino]-4-[p-(β-diethylamino-ethoxy)-anilino]-quinazoline of the formula

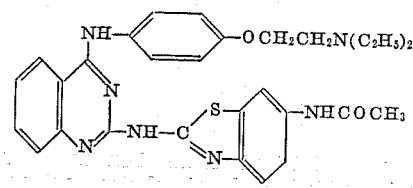

and this, after recrystallization from xylol, melts at 166–170°.

The 2-chloro-4-[p-(β-diethylamino-ethoxy)-anilino]-quinazoline-hydrochloride used as starting material in this example may be prepared as follows:

Into 6.6 parts by weight of 2,4-dichloro-quinazoline, dissolved in 60 parts by volume of dry benzene, there are added dropwise, and while stirring and boiling gently, a solution of 6.3 parts by weight of p-(β-diethylamino-ethoxy)-aniline in 60 parts by volume of dry benzene, whereafter boiling is continued for 2 to 3 hours. Hereupon the hydrochloride of the new intermediate separates out. It is suction-filtered and recrystallized from absolute ethanol, and then has a melting point of 211–213° (with decomposition).

*Example 27*

3.3 parts by weight of 2-chloro-4-[β-piperidyl-(N)-ethylamino]-quinazoline-hydrochloride and 1.6 parts by weight of 2-amino-6-methyl-benzthiazole are fused together after the manner described in Example 1. The cooled and finely pulverized melt is digested with 60 parts by volume of absolute ethanol and suction-filtered while still warm. The resultant hydrochloride, which has a melting point of 343–344°, is converted into the base, 2-[6'-methyl-benzthiazolyl-(2')-amino]-4-[β-piperidyl-(N)-ethylamino]-quinazoline of the formula

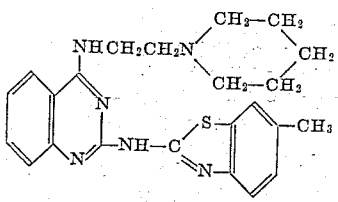

and the latter is recrystallized from chlorobenzene, whereupon it has a melting point of 204–206°. The di-methane-sulfonate melts at 312–313°.

Example 28

2.69 parts by weight of 2-chloro-4-(β-diethylamino-ethylamino)-quinazoline - hydrochloride and 2.15 parts by weight of 2-amino-4,5-diphenyl-thiazole are thoroughly admixed and heated in the oil bath. At an oil bath temperature of 180–220°, the melt reacts with spontaneous evolution of heat. The melt is then maintained for a short additional time at 210°, pulverized after cooling, and then recrystallized from 110 parts by volume of absolute ethanol. The thus-obtained hydrochloride is converted into the base, 2-[4',5'-diphenyl-thiazolyl-(2')-amino]-4-(β-diethylamino-ethylamino)-quinazoline of the formula

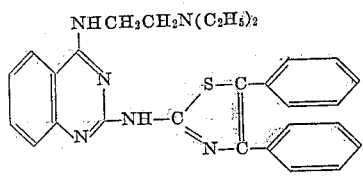

and recrystallized from toluene; melting point 198–202°. The di-methane-sulfonate melts at 290–292°.

Example 29

10 parts by weight of 2-chloro-4-(β-diethylamino-ethylamino)-quinazoline - hydrochloride and 8.1 parts by weight of 2-amino-4-(p-bromophenyl)-thiazole are reacted at a temperature of 200–250° in the manner described in Example 1. The pulverized melt is then dissolved while hot in 200 parts by volume of ethanol of 80% strength, the solution filtered over animal charcoal and mixed with acetic ester until crystallization sets in. From the hydrochloride so obtained, which melts at 312–314° (with decomposition), and after mixing its watery solution with caustic soda solution, there results the 2-[4'-(p-bromo-phenyl)-thiazolyl-(2')-amino]-4-(β-diethylamino-ethylamino)-quinazoline of the formula

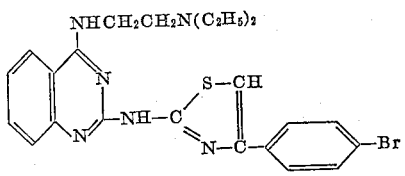

which melts when recrystallized from a mixture of benzene and petroleum ether at 219–221°.

Example 30

10.3 parts by weight of 2-chloro-4-[1'-diethylaminobutyl-(3')-amino]-quinazoline-hydrochloride and 4.9 parts by weight of 2-amino-6-methyl-benzthiazole are reacted in a manner analogous to that of Example 1. The resulting melt is pulverized and recrystallized from 25 parts by volume of absolute ethanol and 30 parts by volume of acetic ester. The so obtained hydrochloride whose melting point is at 295–296° can be converted in the usual manner into the free base, 2-[6'-methyl-benzthiazolyl-2')-amino]-4-[1''-diethylaminobutyl-(3'')-amino]-quinazoline of the formula

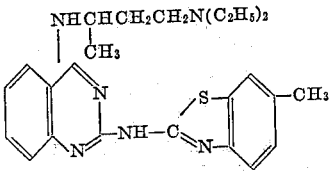

It melts at 142–143°.

The 2-chloro-4-[1'-diethylamino-butyl-(3')-amino]-quinazoline-hydrochloride is obtained by boiling molecular quantities of 2,4-dichloro-quinazoline and 1-diethylamino-3-aminobutane in benzene for one hour. When recrystallized from acetone, it melts at 165–170°.

Having thus described the invention, what is claimed is:

1. A compound selected from the group consisting of the 2,4-diamino-quinazolines and their acid salts, the nucleus of which has the configuration

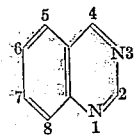

and one of the amino groups of which is bound directly to the carbon atom in the 2-position of a member of the group consisting of a thiazole and an imidazole ring, while the other amino group carries a radical of the general formula wherein X stands for a member selected from the group consisting of alkylene, phenylene-alkyl and phenyleneoxyalkyl radicals, and Y stands for a member selected from the group consisting of dialkylamino, piperidino and morpholino.

2. A 2,4-diamino-quinazoline, the nucleus of which has the configuration

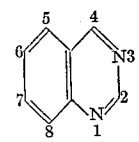

and one of the amino groups of which is bound directly to the carbon atom in the 2-position of a thiazole ring, while the other amino group carries a dialkylaminoalkyl group.

3. A 2,4-diamino-quinazoline, the nucleus of which has the configuration

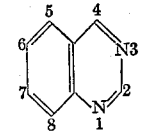

and one of the amino groups of which is bound directly to the carbon atom in the 2-position of an imidazole ring, while the other amino group carries a dialkylaminoalkyl group.

4. An acid salt of a 2,4-diamino-quinazoline, the nucleus of which has the configuration

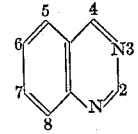

and one of the amino groups of which is bound directly to the carbon atom in the 2-position of a thiazole ring, while the other amino group carries a dialkylaminoalkyl group.

5. An acid salt of a 2,4-diamino-quinazoline, the nucleus of which has the configuration

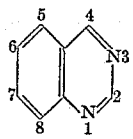

and one of the amino groups of which is bound directly to the carbon atom in the 2-position of an imidazole ring, while the other amino group carries a dialkylaminoalkyl group.

6. A 2,4-diamino-quinazoline, the nucleus of which has the configuration

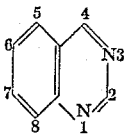

and one of the amino groups of which is bound directly to a benzthiazolyl-(2')-group, while the other amino group carries a dialkylaminoalkyl group.

7. A 2-[benzthiazolyl-(2')-amino]-4-(dialkylaminoalkylamino)-quinazoline, the nucleus of which has the configuration

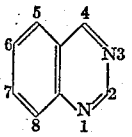

8. 2 - [6' - methyl - benzthiazolyl - (2') - amino] - 4 - (β - diethylaminoethylamino) - quinazoline.

9. A 2 - [phenyl - thiazolyl - (2') - amino] - 4-(dialkylaminoalkylamino)-quinazoline, the nucleus of which has the configuration

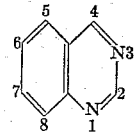

10. 2 - [4' - phenyl - thiazolyl - (2') - amino] - 4-(β-diethylaminoethylamino)-quinazoline.

11. 2 - [4' - (p - bromo - phenyl) - thiazolyl- (2') - amino] - 4 - (β - diethylaminoethylamino- quinazoline.

HANS ISLER.
ALBRECHT HUENI.

REFERENCES CITED

The following references are of record in the file of this patent:

UNITED STATES PATENTS

| Number | Name | Date |
|---|---|---|
| 1,758,792 | Hentrich et al. | May 31, 1930 |
| 2,460,409 | Basford, et al. | Feb. 1, 1949 |